(12) United States Patent
Psenka (10) Patent No.: US 8,661,408 B2
(45) Date of Patent: Feb. 25, 2014

(54) INTEGRATED DEVELOPMENT ENVIRONMENT AND METHODS OF USING THE SAME

(76) Inventor: Michael James Psenka, Sullivan's Island, SC (US)

( * ) Notice: Subject to any disclaimer, the term of this patent is extended or adjusted under 35 U.S.C. 154(b) by 720 days.

(21) Appl. No.: 12/623,975

(22) Filed: Nov. 23, 2009

(65) Prior Publication Data
US 2011/0126170 A1  May 26, 2011

(51) Int. Cl.
*G06F 9/44* (2006.01)
(52) U.S. Cl.
USPC .......................... 717/109; 717/110; 717/113
(58) Field of Classification Search
None
See application file for complete search history.

(56) References Cited

U.S. PATENT DOCUMENTS

| | | | | |
|---|---|---|---|---|
| 4,558,413 | A * | 12/1985 | Schmidt et al. | 717/110 |
| 5,603,034 | A * | 2/1997 | Swanson | 717/111 |
| 5,630,131 | A * | 5/1997 | Palevich et al. | 717/109 |
| 6,678,880 | B1 * | 1/2004 | Roddy | 717/109 |
| 6,990,654 | B2 * | 1/2006 | Carroll, Jr. | 717/109 |
| 7,016,011 | B2 * | 3/2006 | De Haan | 352/43 |
| 7,240,323 | B1 * | 7/2007 | Desai et al. | 717/110 |
| 7,325,226 | B2 * | 1/2008 | Pepin et al. | 717/113 |
| 7,340,716 | B1 * | 3/2008 | Chansler | 717/113 |
| 7,480,916 | B2 | 1/2009 | Beisiegel et al. | |
| 7,571,426 | B2 * | 8/2009 | Carroll, Jr. | 717/109 |
| 7,812,838 | B1 * | 10/2010 | Ian | 345/440 |
| 8,046,737 | B2 * | 10/2011 | Wittenberg et al. | 717/109 |
| 2003/0159129 | A1 * | 8/2003 | Frank et al. | 717/110 |
| 2004/0039934 | A1 * | 2/2004 | Land et al. | 713/200 |
| 2004/0261038 | A1 * | 12/2004 | Ording et al. | 715/792 |
| 2006/0015847 | A1 * | 1/2006 | Carroll | 717/109 |
| 2006/0064674 | A1 * | 3/2006 | Olson et al. | 717/113 |
| 2009/0064106 | A1 | 3/2009 | Webster | |
| 2009/0187842 | A1 | 7/2009 | Collins et al. | |
| 2011/0126170 | A1 * | 5/2011 | Psenka | 717/109 |

OTHER PUBLICATIONS

ProActivity, Inc.; Next Generation Business Process Analysis & Design Solutions for the 21st Century; Sep. 2001; retrieved online on Sep. 19, 2013; pp. 1-23; Retrieved from the Internet: <URL: http://www.providersedge.com/docs/km_articles/Business_Process_Analysis_and_Design_Solutions.pdf>.*

Ella Rabinovich et al.; Analyzing the Behavior of Event Processing Applications; Jul. 2010; ACM; retrieved online on Sep. 19, 2013; pp. 223-234. Retrieved from the Internet: <URL: http://delivery.acm.org/10.1145/1830000/1827465/p223-rabinovich.pdf?>.*

Yoshiharu Kato; An XML-based Microworld Simulator for Business Modeling Education; 2006; IEEE; retrieved online on Sep. 19, 2013; pp. 1-8; Retrieved from the Internet: <URL: http://ieeexplore.ieee.org/stamp/stamp.jsp?tp=&arnumber=4019399>.*

* cited by examiner

*Primary Examiner* — Thuy Dao
*Assistant Examiner* — Hanh T Bui
(74) *Attorney, Agent, or Firm* — McNair Law Firm, P.A.; Douglas L. Lineberry (57) ABSTRACT

A method is provided for generating, in an integrated development environment, a form from which a source code superclass and subclass can be generated. The form is modifiable such that the superclass and subclass integrity is maintained. The method comprises receiving, in an integrated development environment, objects to create a form, wherein the integrated development environment comprises one or more classes. The integrated development environment is utilized to run the form and store the form. The integrated development environment is further utilized to generate and store a superclass comprising one or more of the objects and one or more classes. The superclass is extended with a subclass. The integrated development environment is again utilized to modify the form and generate a new superclass based on the modified form, wherein the integrity between the new superclass and the subclass is maintained.

17 Claims, 7 Drawing Sheets

INTEGRATED DEVELOPMENT ENVIRONMENT AND METHODS OF USING THE SAME

BACKGROUND

Software application development has seen many advances. Low-level languages were very closely related to the hardware of the computing system on which programs were executed. High-level programming languages enabled programming that was more abstract than corresponding low-level programming languages and delivered greater portability across different platforms. Such high-level programming languages also permitted programmers to express operations in terms of variables, mathematical formulas, and Boolean expressions, rather than memory addresses and registers.

Object-oriented programming concepts and object-oriented languages, such as C++, further modularized software applications. Programming languages such as Java and Action Script 3 still further expanded the principles of object-oriented programming by introducing the concept of a virtual machine, which makes it possible to execute an application in a platform-independent environment.

Integrated development environments (IDEs), still further enhanced the efficient development of software applications. An IDE can be used to prototype, code, debug, and maintain software applications. Further, IDEs often include a graphical programming environment. IDEs can include standard components, such as controls and displays, that can be inserted into an application without having to be independently developed. Additionally, IDEs provide the ability to analyze and modify an existing application for which the source code is available.

However, a need still exists for an IDE that is not punitive with regards to software iterations. Methods relating to such an IDE would also be beneficial.

SUMMARY

In view of the recognized features encountered in the prior art and addressed by the present subject matter, improved systems and methodologies for implementing integrated development environments (IDEs) have been provided.

In accordance with one or more aspects of the present subject matter, a method is provided for generating, in an IDE, a form from which a source code superclass and subclass can be generated. The form is modifiable such that the superclass and subclass integrity is maintained. The method comprises receiving, in an IDE, objects to create a form, wherein the IDE comprises one or more classes. The IDE is utilized to run the form and store the form. The IDE is further utilized to generate and store a superclass comprising one or more of the objects and one or more classes. The superclass is extended with a subclass. The IDE is again utilized to modify the form and generate a new superclass based on the modified form, wherein the integrity between the new superclass and the subclass maintained.

In accordance with other aspects of the present disclosure, a computer-readable medium encoded with a computer program is provided. The computer program, when executed, can perform one or more of the above-described procedures.

Additional objects and advantages of the present subject matter are set forth in, or will be apparent to, those of ordinary skill in the art from the detailed description herein. Also, it should be further appreciated that modifications and variations to the specifically illustrated, referred and discussed features and elements hereof may be practiced in various embodiments and uses of the invention without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure including the best mode of practicing the appended claims and directed to one of ordinary skill in the art is set forth more particularly in the remainder of the specification. The specification makes reference to the appended figures, in which:

Use of like reference numerals is intended to illustrate like or analogous components.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is directed to an improved integrated development environment (IDE). The systems and methods can utilize a graphical user interface or (GUI) that provides visual interaction and utilizes pictures or other visual representations besides text or characters. The IDE described herein permits the visual design layer to be "disconnected" from the data programmatic layer during both design and run-time. This allows for the same user-interface to be redesigned at runtime without a re-compilation of the software. In this manner, individual users within the same installation can have forms that behave differently based on their needs, with visual behavior changing but not functional behavior.

The systems and methods of the present disclosure permit designing of a form in an IDE, generation of a source code superclass based on the form, and possible creation of an extensible subclass that allows easy access to any object or property created in the superclass. However, the systems and methods described herein also permit a user to go back to the initial visual design and recreate the superclass, without the necessity of updating the subclass created downstream. Such "non-linear" development greatly empowers users to complete the steps of typical software development out of order without a penalty.

In this regard, the IDE allows a user to design and create one or more of either A) an application user-interface used within a larger application (also referred to herein as a "form"), B) a presentation (similar to a Microsoft Power-Point® presentation), and/or C.) an image used for other design purposes.

Figure 1:
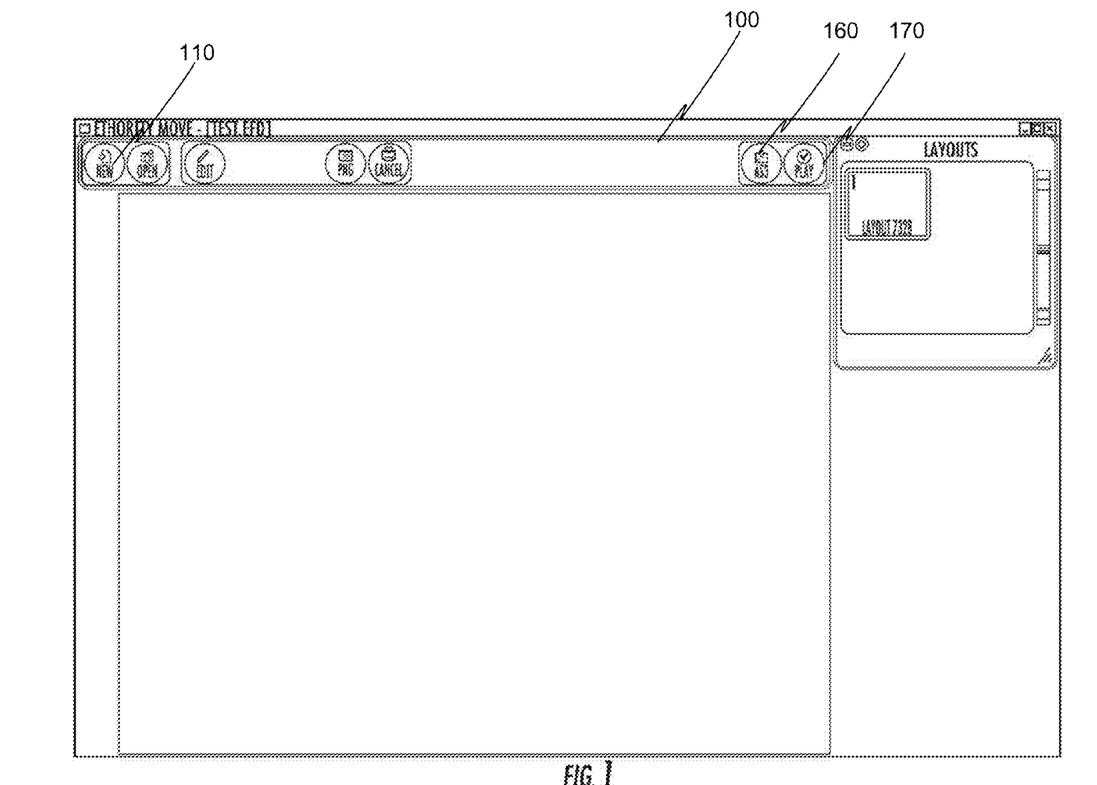
FIGS. 1-5 are examples of user interfaces of an IDE in accordance with certain aspects of the present disclosure.

Referring to FIG. 1, an example of a user interface of an IDE in accordance with certain aspects of the present disclosure is illustrated. The IDE includes a main window 100, providing buttons for access to the main features of the IDE.

Figure 2:
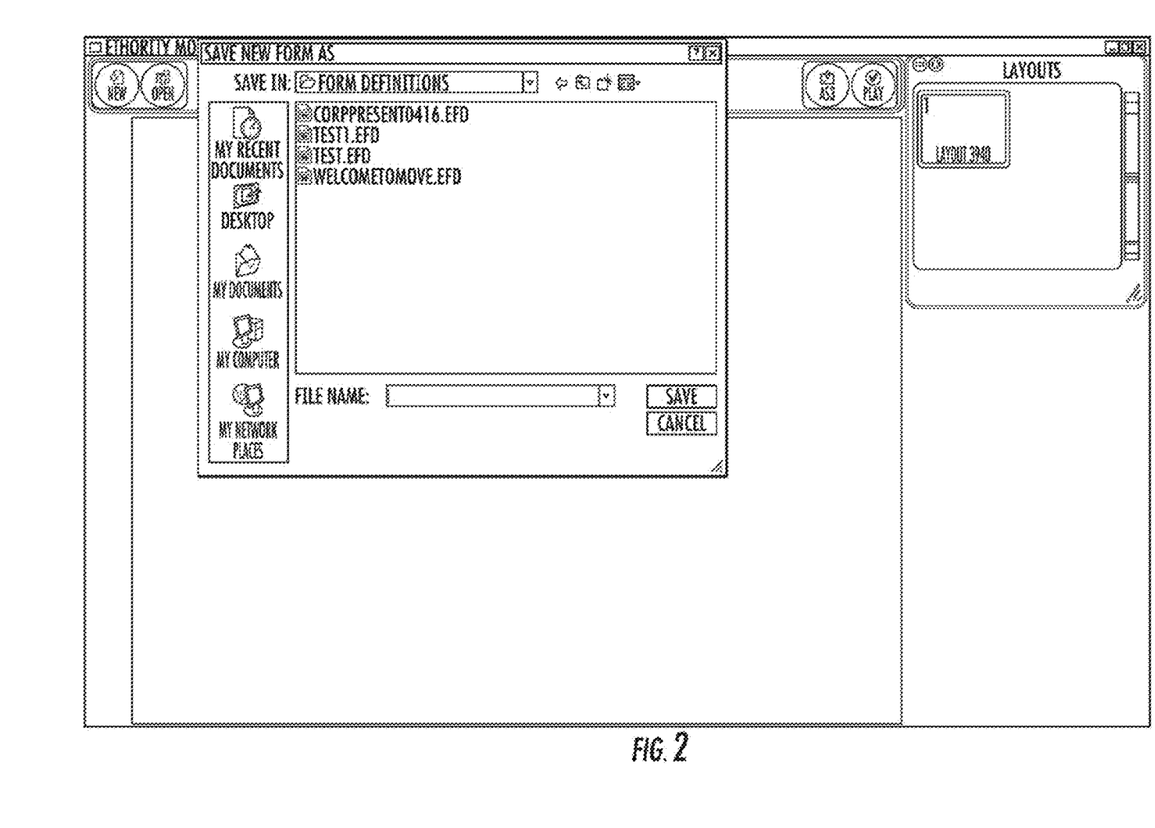

For instance, new form button 110 allows a user to load or create a new form. Referring to FIG. 2, a dialog box allows the user to name and save a new form when new form button is clicked. The IDE stores the collection of objects that a designer creates into a XML based formatted file with an .efd extension that the IDE can read to reproduce the objects on stage at runtime. However, it should be appreciated that any suitable file format can be utilized, such as any extension with a properly formatted XML file. This runtime loaded XML permits the application form or presentation to be redesigned at runtime and loaded or transferred to other objects without a recompilation of the underlying programming logic for the data objects.

Figure 3:
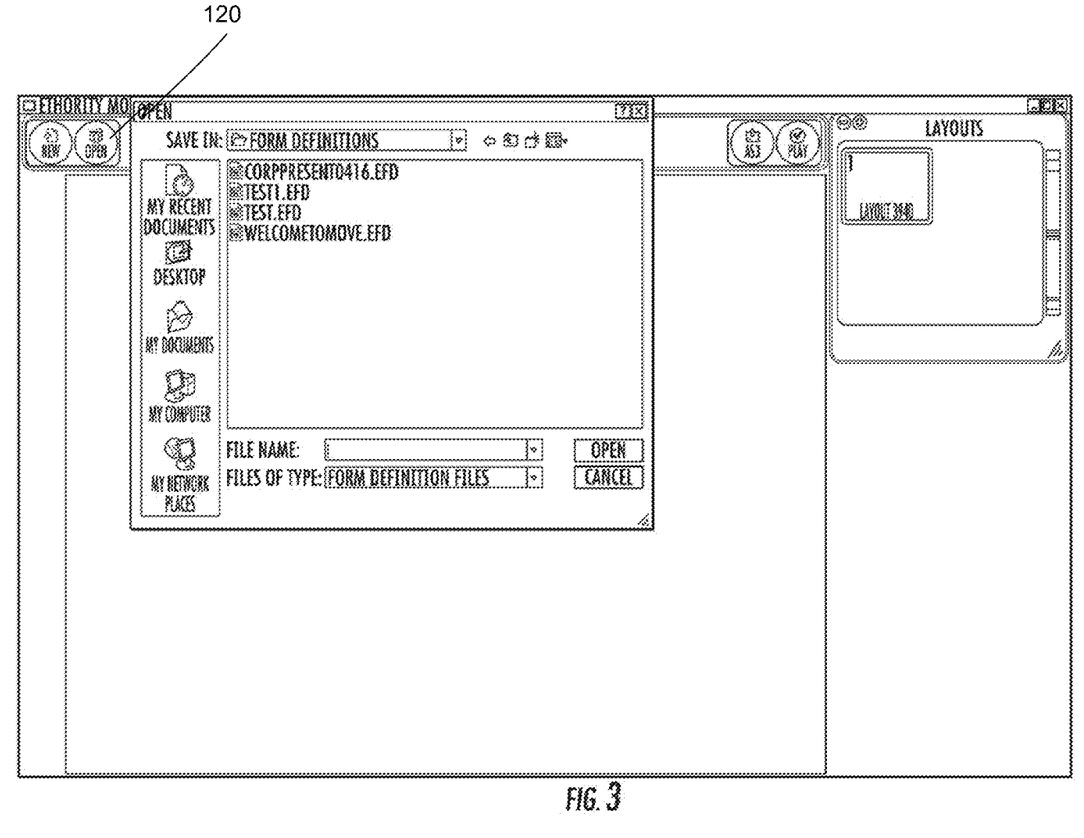
Figure 4:
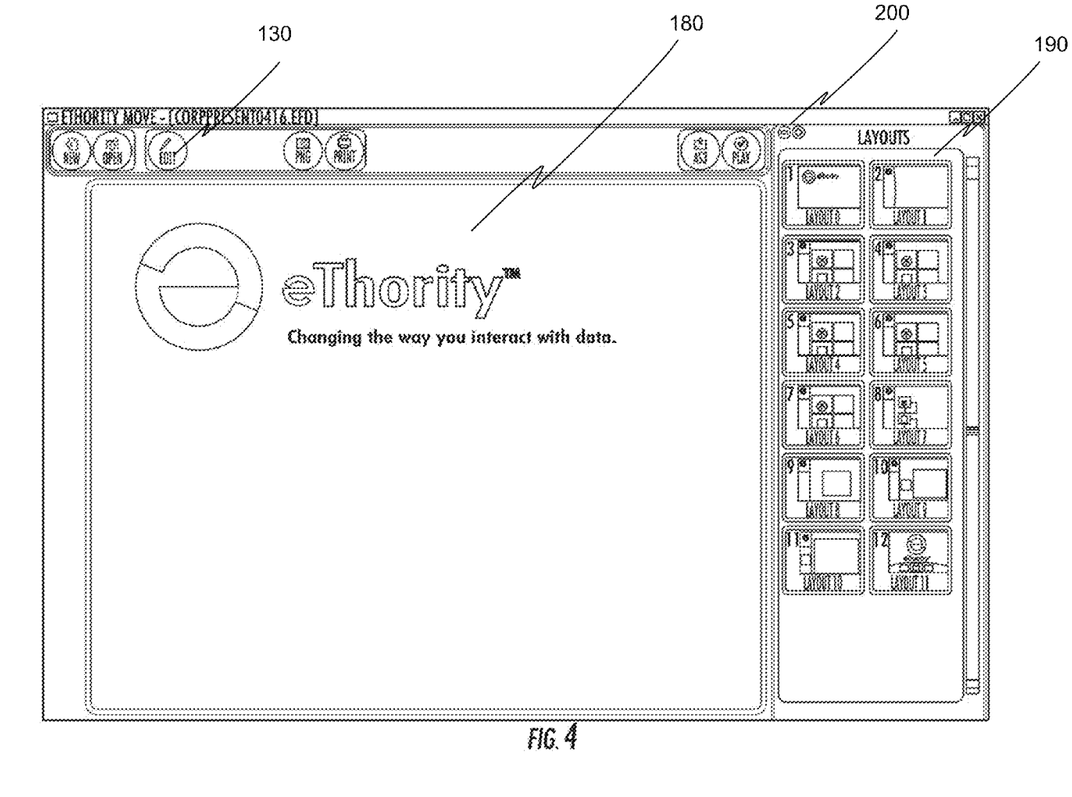

Referring to FIG. 3, open button 120 permits a user to open an existing form through a dialog box that permits the user to access previously created forms. As illustrated in FIG. 4, once opened, the form appears in form window 180 with each layout in the form visible in layout window 190, which can be increased or decreased in size with plus and minus buttons 200.

Figure 5:
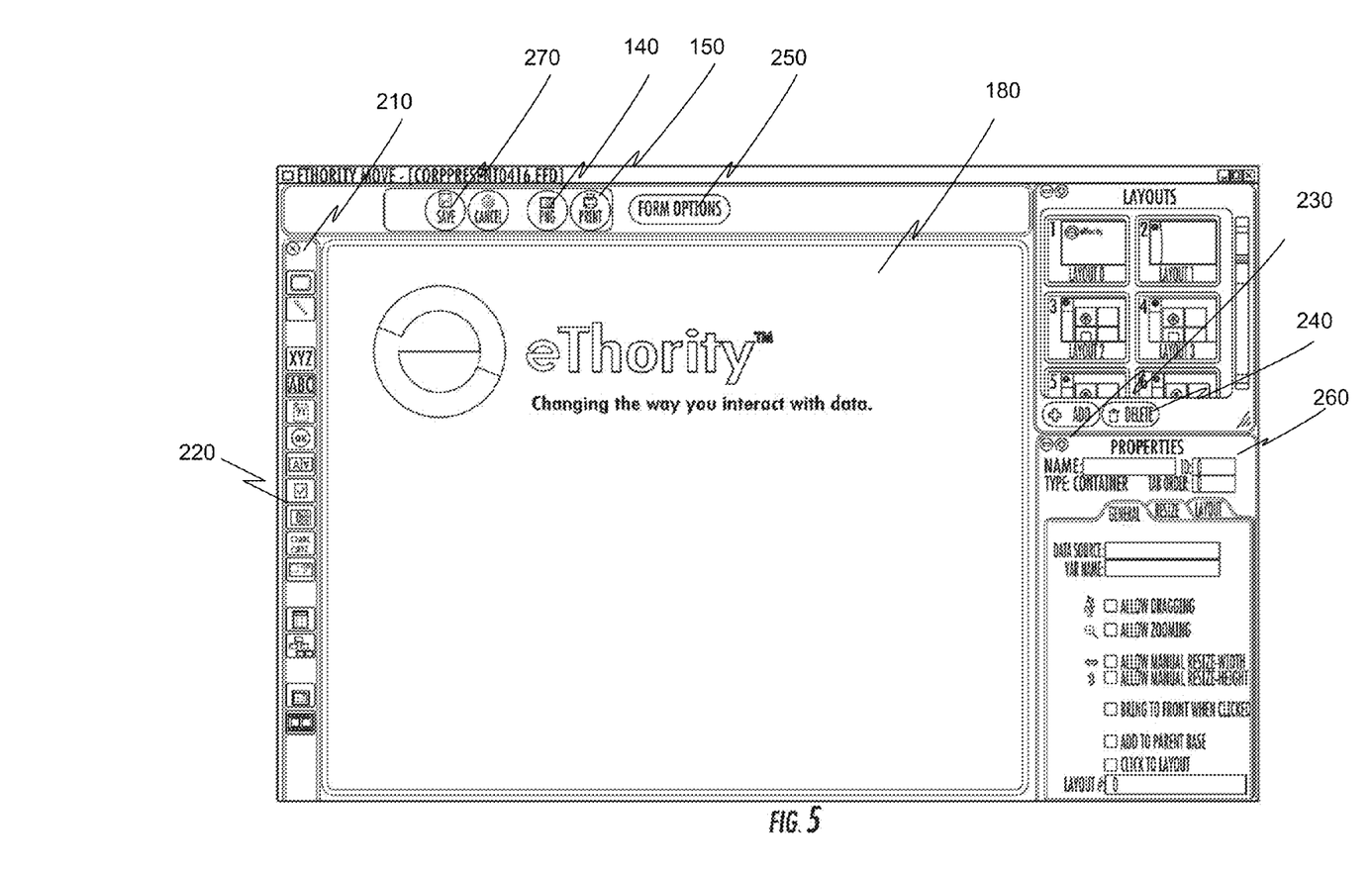

Edit button 130 allows a user to edit a form. Referring to FIG. 5, when edit button 130 is clicked, an edit interface 210 is opened which allows a user to modify the form. New layouts can be added with the add button 230 while existing layouts can be deleted with the delete button 240. In addition, the user can click a layout to make it appear in form window 180. Tool bar 220 can be used to incorporate objects into the form. For instance, shapes, lines, text, dates, buttons, colors, selection boxes, number selectors, choice boxes, tables, graphics, movies, sounds, or the like can be added as objects into form. However, any suitable object as would be understood by one of ordinary skill in the art is contemplated by the present disclosure. Properties window 260 allows the user to control the properties of each object, including object elevation, color, font style and size, visibility of objects, and the like. The objects can be resized by a user, with the size information of each object in each layout being stored by the IDE.

The IDE can include one or more classes that can be utilized in the IDE or can be used independently of the IDE. Such classes have novel functionality. For instance, a parent class defining a container object can include a graphical child element nested within the container object. In certain embodiments, the container object can recursively create the child when the form is run. The child can be resized and repositioned based on the container object width and height. For instance, the child element can be resized by anchoring the child element bottom or right side to the container object right side or center for width and bottom side or center for height. In addition, in certain embodiments a second class can be present that defines a second container object. The second container object allows resizing of the container object by one or more control points on the container object. Advantageously, the form only stores the offsets between the one or more control points of the different container object shapes in each layout rather than the absolute position of the control points. One or more of the container objects can also include a scrollbar that can be distorted to match the shape of the container object.

A significant feature of the IDE described herein is the multi-layout capability and the ease at which such layouts can be created. The layout functionality allows that for a single user-interface (e.g. a purchasing form), the user can design multiple possible configurations by clicking a button to create a new layout and then dragging onscreen objects and changing their properties for a particular layout. The layouts are a non-timeline based way to animate objects onscreen. When a designer designs multiple layouts in the non-timeline based animation process, the objects onscreen will morph shapes, move, resize, and change other visual characteristics between the two different layouts. Thus, the form will automatically animate between the two differently defined states.

A form options button 250 allows a user to manipulate various aspects of the form, including the height and width of the form, the background color, the background type, the scale, package names, inheritance characteristics of the objects in the form, and the like. PNG button 140 allows a user to render a form to a .png graphic file. However, any suitable graphic file as would be known in the art can be created. Print button 150 allows the form to be sent for printing to a local or network printer or utility that can receive the form as input. Save button 270 allows the form to be saved and the user to return to main window 100 while cancel button returns the user to main window 100 without saving the form.

Referring again to FIG. 1 and main window 100, AS3 button 160 allows a user to utilize the IDE to generate Adobe Actionscript 3 (AS3) sourcecode for the superclass. However, it should be appreciated that such is not a limitation of the present subject matter to the AS3 programming language as the present disclosure may be implemented by those of ordinary skill in the art to generate sourcecode for any suitable programming language. Play button 170 allows a user to run the form, including the one or more layouts relating to the same. In this regard, a player can be launched by the IDE to either play each of the layouts as an animation, or permit the user to click through each of the layouts.

Figure 6:
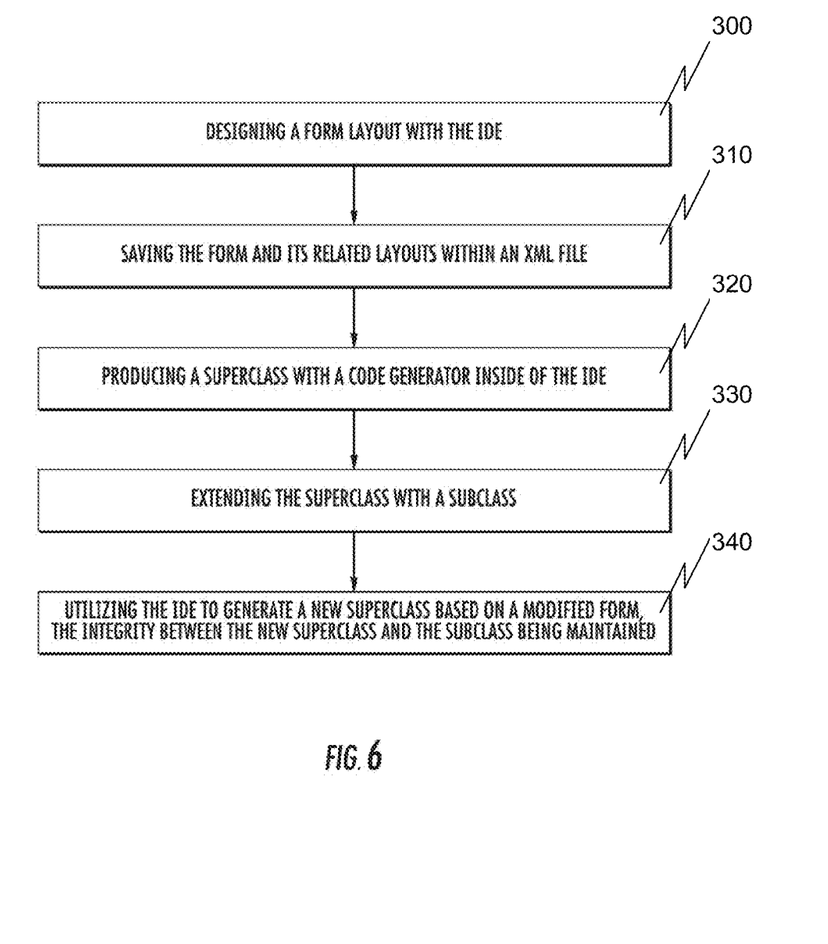
FIG. 6 is a block diagram illustrating components in an exemplary implementation of the present disclosure.

Referring to FIG. 6, a diagram of process steps in accordance with the present disclosure is illustrated. The process includes designing a form layout with the IDE, shown as 300. Such a form and its related layouts can be saved within an XML formatted file, as shown by 310. The form can be used for a variety of purposes including prototype demonstration, a presentation, or a case tool for code generation. The IDE produces a superclass with a code generator inside of the IDE that can output an AS3-based, object oriented class that utilizes data and visual objects from the IDE, as shown in 320 (Example 1 illustrates such an output). Referring to 330, the superclass can be extended with a subclass that permits massive flexibility with the base object oriented language. For example, a programmer can modify the variables and methods within the class to produce a pure actionscript form that can be compiled. The form can declare form variables, instantiate variables, manage the display list for these variables, and set the default PropertyXML for the form. Next, the XML formatted file can be changed and provided as an alternate visual design that can be loaded at runtime without recompiling the application, as shown in 340. Users can be provided with the IDE at runtime to allow them to redesign the interface for their purposes without requiring a recompile.

Figure 7:
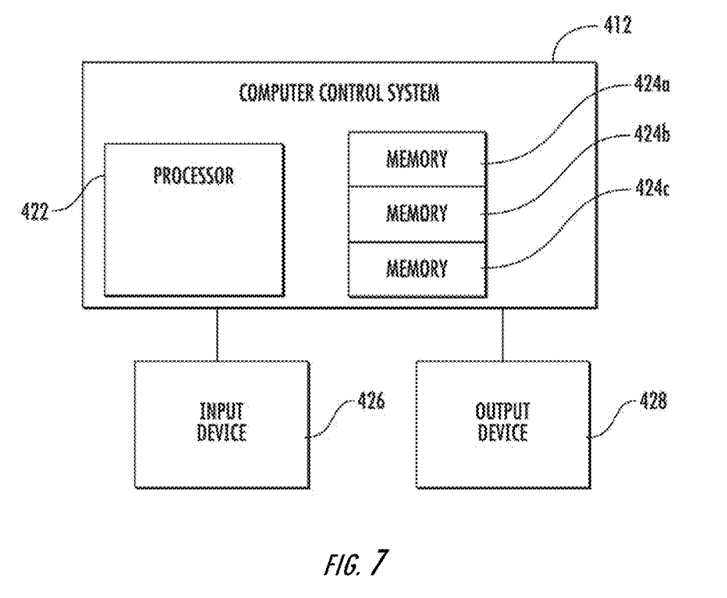
FIG. 7 is a diagram illustrating an exemplary hardware arrangement in which systems of the present disclosure can be implemented.

FIG. 7 illustrates a system which is a simplified example of a computer system/data processing system capable of performing the computing operations described herein with respect to a preferred embodiment of the present disclosure. Computer 412 can generally include such components as at least one memory/media element or database for storing data and software instructions as well as at least one processor. In the particular example of FIG. 7, a processor(s) 422 and associated memory/media elements 424a, 424b and 424c are configured to perform a variety of computer-implemented functions (i.e., software-based data services). At least one memory/media element (e.g., element 424b in FIG. 7) is dedicated to storing software and/or firmware in the form of computer-readable and executable instructions that will be implemented by the one or more processor(s) 422. Other memory/media elements (e.g., memory/media elements 424a, 424c) are used to store data which will also be accessible by the processor(s) 422 and which will be acted on per the software instructions stored in memory/media element 424b. The various memory/media elements of FIG. 7 may be provided as a single or multiple portions of one or more varieties of computer-readable media, such as but not limited to any combination of volatile memory (e.g., random access memory (RAM, such as DRAM, SRAM, etc.) and nonvolatile memory (e.g., ROM, flash, hard drives, magnetic tapes, CD-ROM, DVD-ROM, etc.) or any other memory devices including diskettes, drives, other magnetic-based storage media, optical storage media and others. Although FIG. 7 shows three separate memory/media elements 424a, 424b and 424c, the content dedicated to such devices may actually be stored in one memory/media element or in multiple elements, Any such possible variations and other variations of data storage will be appreciated by one of ordinary skill in the art.

In one particular embodiment of the present subject matter, a first portion of memory/media 424a is configured to store input data for the subject IDE. Data in memory 424a may also include input parameters provided from a user. Although such user-established limits and other input data may be pre-programmed into memory/media element 424a, they may also be entered as input data from a user accessing an input device 426, which may correspond to one or more peripheral devices configured to operate as a user interface with computer 412. Exemplary input devices may include but are not limited to a keyboard, touch-screen monitor, microphone, mouse and the like.

Second memory element 424b includes computer-executable software instructions that can be read and executed by processor(s) 422 to act on the data stored in memory/media element 424a to create new output data for storage in a third memory/media element 424c. Such output data may be provided to a peripheral output device 428, such as monitor, printer or other device for visually depicting the output data, or as control signals to still further components. Computing/processing device(s) 422 may be adapted to operate as a special-purpose machine by executing the software instructions rendered in a computer-readable form stored in memory/media element 424b. When software is used, any suitable programming, scripting, or other type of language or combinations of languages may be used to implement the teachings contained herein. In other embodiments, the methods disclosed herein may alternatively be implemented by hard-wired logic or other circuitry, including, but not limited to application-specific circuits.

The process in which the systems and methods described herein develop software allows a user to work in a non-punitive manner for iteration. An issue with the current state of software development is that the user-interface must be "right" the first time, or else it is very difficult to go back and make changes. The systems and methods described herein have completely separated the visualization language layer from the data object layer or business object layer, so as to allow a user to easily go back to a user-interface and completely change the same without any downstream penalty or regression testing required. Other systems have a display layer and a separate business layer, but they are intimately tied to each other. Change one and the other must be changed as well. The present disclosure eliminates the dependency between the visualization layer and business object layer.

Example

The following example illustrates an AS3-based file output in accordance with certain aspects of the present disclosure.

```
package
{
    //*************************************************************************
    //*** Generated by IDE                *************************************
    //*** Copyright eThority, Inc. 2009
    *************************************
    //*************************************************************************
    //*************************************************************************
    import flash.display.*;
    import flash.events.*;
    import flash.text.*;
    import flash.filters.*;
    import flash.net.*;
    import flash.geom.*;
    import flash.ui.*;
    import flash.utils.*;
    import eThority.asc.display.*;
    import eThority.asc.text.*;
    import eThority.asc.utils.*;
    import eThority.asc.events.*;
    import move.display.*;
```

```
        import move.support.*;
        import move.events.*;
        public class Test extends MForm
        {
                //*******************************************************
                //************ Begin Move Variable Delaration ********
                //*******************************************************
                //*******************************************************
                //************ End Move Variable Delaration **********
                //*******************************************************
                public function Test( )
                {
                        initObjects( );
                }
                private function initObjects( ):void
                {
                        __formXML              = null;
                        __formXML              = getDefaultXML( ); //**** this is a
call to a function in the include file
                        this.HasBackground= false;
                        this.EstageWidth       = this.EWidth            = this.LayoutWidth    =
this.TargetWidth       = this.__formXML.EStageWidth;
                        this.EstageHeight      = this.EHeight           = this.LayoutHeight =
this.TargetHeight      = this.__formXML.EStageHeight;
                        //*******************************************************
                        //************ Begin Move Object Instantiation *******
                        //*******************************************************
                        //*******************************************************
                        //************ End Move Object Instantiation *********
                        //*******************************************************
                        //*******************************************************
                        //************ Begin Move Display List **************
                        //*******************************************************
                        //*******************************************************
                        //************ End Move Display List ****************
                        //*******************************************************
                        //***********************************************************
                        //************ Begin Move Event Handlers **************
                        //***********************************************************
                        //***********************************************************
                        //************ End Move Event Handlers ****************
                        //***********************************************************
                }
                private function createPanels( ):void
                {
                        for each (var oElement:XML in this.__formXML.Element)
                        {
                                var newElement:MContainer =
createEPortObject(Number(oElement.EType));
                                if (newElement != null)
                                {
                                        newElement.PropertyPanel = this.PropertyPanel;
                                        newElement.PropXML = oElement;
                                        this.Content.addChild(newElement);
                                }
                        }
                }
                //*******************************************************
                //************ Begin Move Event Methods **************
                //*******************************************************
                //*******************************************************
                //************ End Move Event Methods ***********
                //*******************************************************
                protected function getDefaultXML( ):XML
                {
                        var anchorLayoutIDNumber:Number = 3510;
                        var anchorLayoutID:String =
anchorLayoutIDNumber.toString( );
                        var panelXML:XML =
<root>
   <moveVersion>1.5.06</moveVersion>
   <backgroundColor>0</backgroundColor>
   <menuColor>0</menuColor>
   <BackgroundType>0</BackgroundType>
   <EStageWidth>1000</EStageWidth>
   <EStageHeight>700</EStageHeight>
   <EPackageName/>
   <InheritFrom>0</InheritFrom>
   <formScaleMode>0</formScaleMode>
   <showMenu>false</showMenu>
```

```
        <interactivePlayMode>false</interactivePlayMode>
        <elementLayout>
            <layoutID>3510</layoutID>
            <layoutNumber>1</layoutNumber>
            <layoutName>Layout 3510</layoutName>
        </elementLayout>
    </root>
    ;
                                    //*** repopulate the optimized code
                                    var anchorLayoutXML:XML;
                                    var thisLayoutXMLList:XMLList;
                                    var anchorLayoutXMLList:XMLList;
                                    var thisLayoutXML:XML;
                                    for each (var oElement:XML in panelXML..Element)
                                    {
                                            //*** get the values for the anchor list
                                            anchorLayoutXMLList =
oElement.elementLayout.(layoutID == anchorLayoutID).children( );
                                            for each (var oLayout:XML in
oElement.elementLayout.(layoutID != anchorLayoutID))
                                            {
                                                //*** cycle through list
                                                for each (var pXML:XML in
anchorLayoutXMLList)
                                                {
                                                        var pName:String = pXML.localName( );
                                                if (!oLayout.hasOwnProperty(pName))
                                                {
                                                oLayout.appendChild(pXML.copy( )) ;
                                    }
                                                }
                                            }
                                    }
                                    return panelXML;
                            }
                        }
}
```

The material particularly shown and described above is not meant to be limiting, but instead serves to show and teach various exemplary implementations of the present subject matter. As set forth in the attached claims, the scope of the present invention includes both combinations and sub-combinations of various features discussed herein, along with such variations and modifications as would occur to a person of skill in the art.

What is claimed is:

1. A method executed by a computer for generating, in an Integrated Development Environment (IDE), a form from which a source code superclass and subclass can be generated, the form being modifiable such that the superclass and subclass integrity is maintained, the method comprising:
receiving, in an IDE, objects to create a form, wherein the IDE comprises one or more classes;
utilizing the IDE to run the form;
utilizing the IDE to store the form;
utilizing the IDE to generate and store a superclass comprising one or more of the objects and one or more classes;
extending the superclass with a subclass;
utilizing the IDE to modify the form;
utilizing the IDE to generate a new superclass based on the modified form, wherein the integrity between the new superclass and the subclass is maintained;
wherein a visual design layer of the IDE is disconnected from a data programmatic layer of the IDE wherein the visual design layer may be manipulated while the programmatic layer remains static, such that visual behavior of the form changes but not functional behavior of the form;
wherein the form is stored in an Extensible Markup Language file format; and
wherein a second container object is included and comprises a scrollbar, the scrollbar being configured to have a shape that can be distorted to match the shape of the second container object.

2. A method as in claim 1, wherein the IDE provides a user with a development environment comprising a graphical user interface (GUI), the GUI permitting the user to drag-and-drop the objects within the form.

3. A method as in claim 2, wherein the form comprises multiple layouts.

4. A method as in claim 3, wherein the layouts comprise non-timeline based layouts.

5. A method as in claim 3, wherein each layout includes objects, the GUI permitting a user to resize the objects in each layout form, wherein the IDE stores the size information for the objects in each layout.

6. A method as in claim 1, wherein the one or more classes comprise a parent class defining a first container object that can include a graphical child element nested within the container object.

7. A method as in claim 6, wherein the container object can recursively create the graphical child element when the form is run.

8. A method as in claim 6, wherein the graphical child element can be resized and repositioned based on the container object width, height, or combinations thereof.

9. A method as in claim 8, wherein the graphical child element repositioning is configured to anchor the child element position to the left, top, right, bottom, or center of the container object.

10. A method as in claim 8, wherein the graphical child element resizing is configured to resize the child element based on the container object width and height by anchoring the child element bottom or right side to the container object right side or center for width and bottom side or center for height.

11. A method as in claim 6, wherein the one or more classes further comprising a second class defining the second container object that inherits properties from the first container object.

12. A method as in claim 11, wherein the second container object comprises one or more control points that allow reshaping of the object.

13. A method as in claim 12, wherein the form comprises multiple layouts, the second container object having different shapes in each layout, wherein the form stores offsets between the one or more control points of different shapes rather than absolute position of the control points.

14. A non-transitory computer-readable medium encoded with a computer program that, when executed, performs the steps of: receiving, in an IDE, objects to create a form, wherein the IDE comprises one or more
classes; utilizing the IDE to run the form; utilizing the IDE to store the form;
utilizing the IDE to generate and store a superclass comprising one or more of the objects and one or more classes;
extending the superclass with a subclass;
utilizing the IDE to modify the form; and
utilizing the IDE to generate a new superclass based on the modified form, wherein the integrity between the new superclass and the subclass is maintained; and
wherein a visual design layer of the IDE is disconnected from a data programmatic layer of the IDE wherein the visual design layer may be manipulated while the programmatic layer remains static, such that visual behavior of the form changes but not the functional behavior of the form;
wherein the form is stored in an Extensible Markup Language file format; and
wherein a second container object is included and comprises a scrollbar, the scrollbar being configured to have a shape that can be distorted to match the shape of the second container object.

15. A computer-readable medium as in claim 14, wherein the IDE provides a user with a development environment comprising a graphical user interface (GUI), the GUI permitting the user to drag-and-drop the objects relating to the form.

16. A computer-readable medium as in claim 15, wherein the form comprises multiple layouts.

17. A computer-readable medium as in claim 16, wherein the layouts comprise non-timeline based layouts.

* * * * *